US012563373B2

(12) United States Patent
Veloso et al.

(10) Patent No.: US 12,563,373 B2
(45) Date of Patent: Feb. 24, 2026

(54) COMMUNICATION SYSTEM AND METHOD FOR A VEHICLE

(71) Applicant: GM GLOBAL TECHNOLOGY OPERATIONS LLC, Detroit, MI (US)

(72) Inventors: Alex J. Veloso, Rochester Hills, MI (US); George Knish, Rochester Hills, MI (US); Dipankar Pal, Sylvania, OH (US); Ahmed J Khan, Troy, MI (US); Zeyad Yehia, Mesa, AZ (US); Eric T. Hosey, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 18/326,219

(22) Filed: May 31, 2023

(65) Prior Publication Data

US 2024/0406693 A1    Dec. 5, 2024

(51) Int. Cl.
H04W 4/48 (2018.01)
G07C 5/00 (2006.01)
G07C 5/08 (2006.01)

(52) U.S. Cl.
CPC .............. H04W 4/48 (2018.02); G07C 5/008 (2013.01); G07C 5/0833 (2013.01)

(58) Field of Classification Search
CPC ....... G07C 5/008; G07C 5/0833; H04L 67/12; H04R 2499/13; H04W 4/48; H04W 4/90
USPC ...................................................... 455/569.2
See application file for complete search history.

(56) References Cited

U.S. PATENT DOCUMENTS

| | | | |
|---|---|---|---|
| 2011/0208388 A1* | 8/2011 | Yang ................... | G10L 21/0316 701/36 |
| 2017/0171730 A1* | 6/2017 | Tzirkel-Hancock ......................... | H04W 4/023 |
| 2017/0285712 A1* | 10/2017 | Veloso ................. | G06F 3/0488 |
| 2021/0204057 A1* | 7/2021 | Ludwig .................. | G06F 21/10 |

FOREIGN PATENT DOCUMENTS

WO    WO-2018135105 A1 *   7/2018   ............. H04R 29/00

* cited by examiner

*Primary Examiner* — Hirdepal Singh
(74) *Attorney, Agent, or Firm* — Quinn IP Law

(57) ABSTRACT

A telematics controller, a second controller, a dual-function audio speaker, and a switch are included. The telematics controller is in communication with a first microphone. The telematics controller includes a first amplifier, and is configured to communicate with a remote facility. The second controller includes a second amplifier and a second microphone. The switch is arranged in the telematics controller, and an electrical link is arranged between the second controller and the telematics controller. The dual-function audio speaker is selectively connectable to the second amplifier via the switch and the electrical link. The dual-function audio speaker is also selectively connectable to the first amplifier via the switch. The switch is operatively controlled by the telematics controller, and the telematics controller is operative to control the switch to control the dual-function audio speaker to effect wireless audio communication between the vehicle and the remote facility.

19 Claims, 4 Drawing Sheets

COMMUNICATION SYSTEM AND METHOD FOR A VEHICLE

INTRODUCTION

Vehicles may be equipped with telematics systems and infotainment systems that employ multiple speakers, microphones, and other audio devices that may enhance vehicle operation and communication. Under certain circumstances, a vehicle communication system may be compromised.

A controller for a telematics system may have a dedicated standalone speaker and microphone for communication, and a second controller for an infotainment system may employ separate speaker(s) and microphone(s) to support emergency calls. In some systems there may be five or more speakers that support communication and infotainment such as AM/FM/XM radio, subscription services, hands-free cellular phone communications, etc.

SUMMARY

The concepts described herein include a communication system for a vehicle that is adaptable to effect wireless audio communication when a speaker, microphone, or other audio device has experienced a fault or has been compromised due to a collision or another event. The concepts described herein may reduce or eliminate a need for additional hardware such as wiring harness sheaths and shields to maintain robust two-way telematics communication. Furthermore, the communication system may provide robust response to emergency communications while minimizing the quantity of audio speakers by enabling a telematics controller to rout audio communication to an existing speaker that is under its control in response to a post-collision notification (PCN) signal, thus eliminating a need for a standalone speaker for emergency calls.

The concepts described herein provide, in one embodiment, an architecture that adopts an existing vehicle mid-range speaker to be driven either by an audio amplifier located in a telematics controller, or an audio amplifier located in a second controller, e.g., an infotainment controller, employing logic and circuitry that are controlled by the telematics controller.

An aspect of the disclosure may include a telematics controller, a second controller, a dual-function audio speaker, and a switch. The telematics controller is in communication with a first microphone. The telematics controller includes a first amplifier, and is configured to wirelessly communicate with a remote facility. The second controller includes a second amplifier and a second microphone. The switch is arranged in the telematics controller, and an electrical link is arranged between the second controller and the telematics controller. The dual-function audio speaker is selectively connectable to the second amplifier via the switch and the electrical link. The dual-function audio speaker is also selectively connectable to the first amplifier via the switch. The switch is operatively controlled by the telematics controller, and the telematics controller is operative to control the switch to control the dual-function audio speaker to effect audio communication between the vehicle and the remote facility.

Another aspect of the disclosure may include an emergency service request activator in communication with the telematics controller; wherein the telematics controller is operative to employ the first microphone and the audio speaker to effect audio communication between the vehicle and the remote facility in response to a command from the telematics controller, wherein the command from the telematics controller is generated by activation of the emergency service request activator.

Another aspect of the disclosure may include the telematics controller being operative to employ the first microphone and the audio speaker to effect audio communication between a vehicle occupant and an advisor located at the remote facility in response to the activation of the emergency service request activator.

Another aspect of the disclosure may include the emergency service request activator being an actuator button that is disposed in a cabin area of the vehicle and is proximal to a vehicle operator.

Another aspect of the disclosure may include a vehicle monitoring system in communication with the telematics controller, wherein the telematics controller is operative to employ the first microphone and the audio speaker to effect audio communication between the vehicle and the remote facility in response to a command from the telematics controller, wherein the command from the telematics controller is generated based upon an input from the vehicle monitoring system.

Another aspect of the disclosure may include the vehicle monitoring system being one of a global position system sensor, an inertial monitoring sensor, or an airbag deployment sensor.

Another aspect of the disclosure may include a secondary battery being arranged to supply electric power to the first amplifier when the telematics controller controls the switch to control the audio speaker to effect audio communication between the vehicle and the remote facility.

Another aspect of the disclosure may include the telematics controller being operative to control the switch to control the audio speaker to effect audio communication between the vehicle and the remote facility in response to a request originating from the remote facility.

Another aspect of the disclosure may include the telematics controller being operative to employ the first microphone and the audio speaker to effect audio communication between the vehicle and the remote facility upon detection of a fault in the second controller.

Another aspect of the disclosure may include the telematics controller being operative to employ the first microphone and the audio speaker to effect audio communication between the vehicle and the remote facility upon a loss of communication with the second controller.

Another aspect of the disclosure may include a communication system for a vehicle that includes a telematics controller, the telematics controller being in communication with a first microphone. The telematics controller includes a first amplifier and the telematics controller is configured to communicate with a remote facility. There is a second amplifier and a second microphone; a dual-function audio speaker; a switch being arranged in the telematics controller, and an electrical link arranged between the second amplifier and the switch. The dual-function audio speaker is selectively connectable to the second amplifier via the switch and the electrical link. The dual-function audio speaker is selectively connectable to the first amplifier via the switch. The switch is operatively controlled by the telematics controller; and the telematics controller is operative to control the switch to control the dual-function audio speaker to effect two-way communication between the vehicle and the remote facility.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
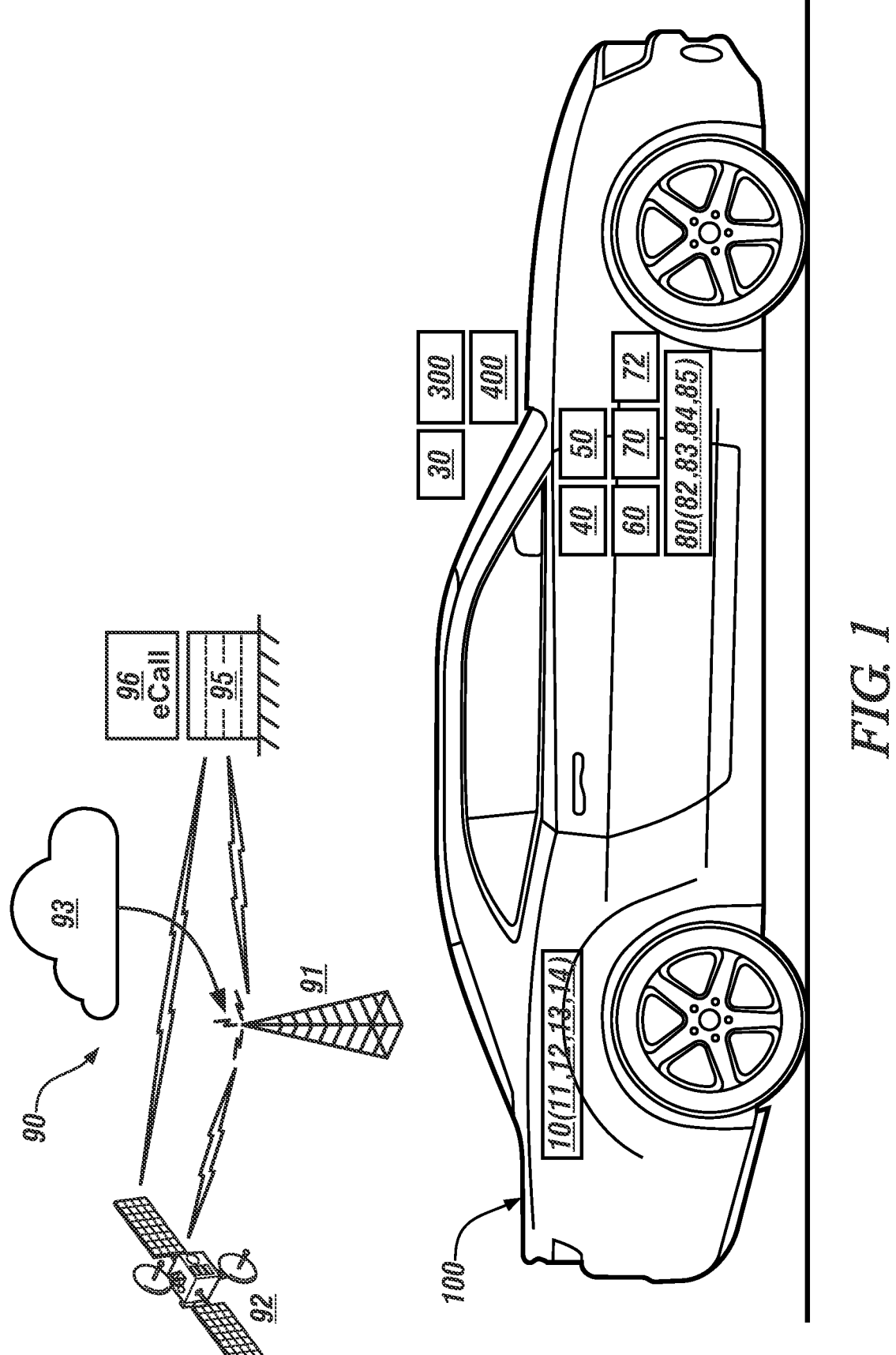
FIG. 1 pictorially illustrates a vehicle, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but merely represents possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure.

Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features.

As employed herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The use of ordinals such as first, second and third does not necessarily imply a ranked sense of order, but rather may only distinguish between multiple instances of an act or structure.

Referring to the drawings, wherein like reference numerals correspond to like or similar components throughout the several Figures, FIGS. 1 through 4, consistent with embodiments disclosed herein, illustrate elements of a vehicle 100 that is arranged to execute an embodiment of a communication system 300 including communication process 400 that may be employed on-vehicle. Details related to the communication system 300 including communication process 400 are described with reference to FIGS. 3 and 4. The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

Referring again to FIGS. 1 and 2, the vehicle 100 is disposed on and able to traverse a travel surface such as a paved road surface. The vehicle 100 includes, in one embodiment, a vehicle operating system 10, a passenger cabin 20, a spatial monitoring system 30, an infotainment system 60, a telematics system 70, and a vehicle monitoring system 80. In one embodiment, the vehicle 100 includes an advanced driver assistance system (ADAS) 40. In one embodiment, the vehicle 100 includes a navigation system 50.

The vehicle operating system 10 is composed of a propulsion system 11, a steering system 12, a braking system 13, and a suspension system 14. Operations of the various elements of the vehicle operating system 10 are controlled by one or multiple controllers in response to operator inputs to operator controls 25.

The vehicle monitoring system 80 includes a plurality of sensors and calibrated routines that are arranged to monitor a plurality of operating parameters 82 of the vehicle operating system 10, including, e.g., vehicle speed, acceleration, braking, yaw rate, roll, pitch, etc.

In one embodiment, the vehicle monitoring system 80 includes a global positioning system (GPS) sensor 83 that is employed by the navigation system 50.

In one embodiment, the vehicle monitoring system 80 includes an inertial measurement unit (IMU) 84. The IMU 84 is an electronic device that employs one or more of a combination of accelerometers, gyroscopes, and magnetometers that are arranged to measure and report vehicle dynamics parameters such as specific force, angular rate, yaw, and orientation of the vehicle 100.

In one embodiment, the vehicle monitoring system 80 includes an airbag deployment sensor 85, which is configured to detect deployment of one or more on-vehicle airbags.

The operator controls 25 may be included in the passenger cabin 20 of the vehicle 100, and may include, by way of non-limiting examples, an accelerator pedal, a steering wheel, a brake pedal, a turn signal indicator, a suspension selection switch, a transmission range selector (PRNDL), a cruise control actuator, an ADAS actuator, a parking brake, and/or other operator-controlled devices.

The passenger cabin 20 also includes an emergency service request activator that is referred to herein as an eCall button 35. The eCall button 35 may be located within the cabin in a location that is accessible to the vehicle operator and one or more passengers. When activated, the eCall button 35 generates signals via the telematics system 70 to connect to emergency services via the The operator controls 25 may also include an operator interface device that is an element of the infotainment system 60, such as a visual display system 24 that includes a touch screen. The operator controls 25 enable a vehicle operator to interact with and direct operation of the vehicle 100 in functioning to provide passenger transportation, navigation, infotainment, environmental comfort, etc., and to gain access to recessed areas on-vehicle.

The navigation system 50 may be employed via the infotainment system 60.

In one embodiment, microphone 28 is arranged to monitor audible sound within the passenger cabin 20 and around the exterior of the vehicle 100.

The spatial monitoring system 30 may also include, in one embodiment, one or a plurality of spatial sensors and systems that are arranged to monitor a viewable region that is peripheral to and/or forward of the vehicle 100, and a spatial monitoring controller. The spatial sensors may include, e.g., a video camera, a lidar sensor, a radar sensor, and/or another device, and are disposed on-vehicle to monitor at least a portion of the viewable region to detect proximate remote objects such as road features, lane markers, buildings, pedestrians, road signs, traffic control lights and signs, other vehicles, and geographic features that are proximal to the vehicle 100.

The ADAS system 40 is configured to implement autonomous driving or advanced driver assistance system (ADAS) vehicle functionalities. Such functionality may include an on-vehicle control system that is capable of providing a level of driving automation. The terms 'driver' and 'operator' describe the person responsible for directing operation of the vehicle 100, whether actively involved in controlling one or more vehicle functions or directing autonomous vehicle operation. Driving automation may include a range of dynamic driving and vehicle operation. Driving automation may include some level of automatic control or intervention related to a single vehicle function, such as steering, acceleration, and/or braking, with the driver continuously having overall control of the vehicle 100. Driving automation may include some level of automatic control or intervention related to simultaneous control of multiple vehicle functions, such as steering, acceleration, and/or braking, with the driver continuously having overall control of the vehicle 100. Driving automation may include simultaneous automatic control of vehicle driving functions that include steering, acceleration, and braking, wherein the driver cedes control of the vehicle for a period of time during a trip. Autonomous vehicle functions may include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc.

The infotainment system 60 provides for human/machine interaction, for purposes of directing operation of an infotainment system, the GPS sensor 83, the navigation system 50, and the like, and includes a controller, e.g., the second controller 330 that is described with reference to FIG. 3. The infotainment system 60 is depicted as a unitary device for ease of description, but may be configured as a plurality of controllers and associated sensing devices in an embodiment of the system described herein. Operator interface devices may include devices that are capable of transmitting a message urging operator action, and may include the visual display system 24. In one embodiment, the visual display system 24 is an electronic visual display module, e.g., a liquid crystal display (LCD) device having touch-screen capability, and/or a heads-up display (HUD).

The telematics system 70 includes a wireless telematics communication system capable of extra-vehicle communication, including communicating with a communication network 90 having wireless and wired communication capabilities. The extra-vehicle communications may include short-range vehicle-to-vehicle (V2V) communication and/or vehicle-to-everything (V2x) communication, which may include communication with an infrastructure monitor, e.g., a traffic camera. Alternatively, or in addition, the telematics system 70 may include wireless telematics communication systems that are capable of short-range wireless communication to a handheld device, e.g., a cell phone, a satellite phone or another telephonic device. In one embodiment the handheld device includes a software application that includes a wireless protocol to communicate with the telematics system 70, and the handheld device executes the extra-vehicle communication, including communicating with an off-board server via the wireless communication network. Alternatively, or in addition, the telematics system 70 may execute the extra-vehicle communication directly by communicating with the remote facility 95 via the communication network 90. The remote facility 95 may facilitate communication during an emergency event, either directly or via the emergency services provider 96.

The communication network 90 may include one or more of cellular communication 91, satellite communication 92, and cloud-based communication 93, all of which are configured to effect communication with a remote facility 95 and/or an emergency services provider 96.

The term "cloud" and related terms may be defined as a model for enabling ubiquitous, convenient, on-demand network access to a shared pool of configurable computing resources (e.g., networks, servers, storage, applications, and services) that may be rapidly provisioned via virtualization and released with minimal management effort or service provider interaction, and then scaled accordingly. A cloud model may be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 2:
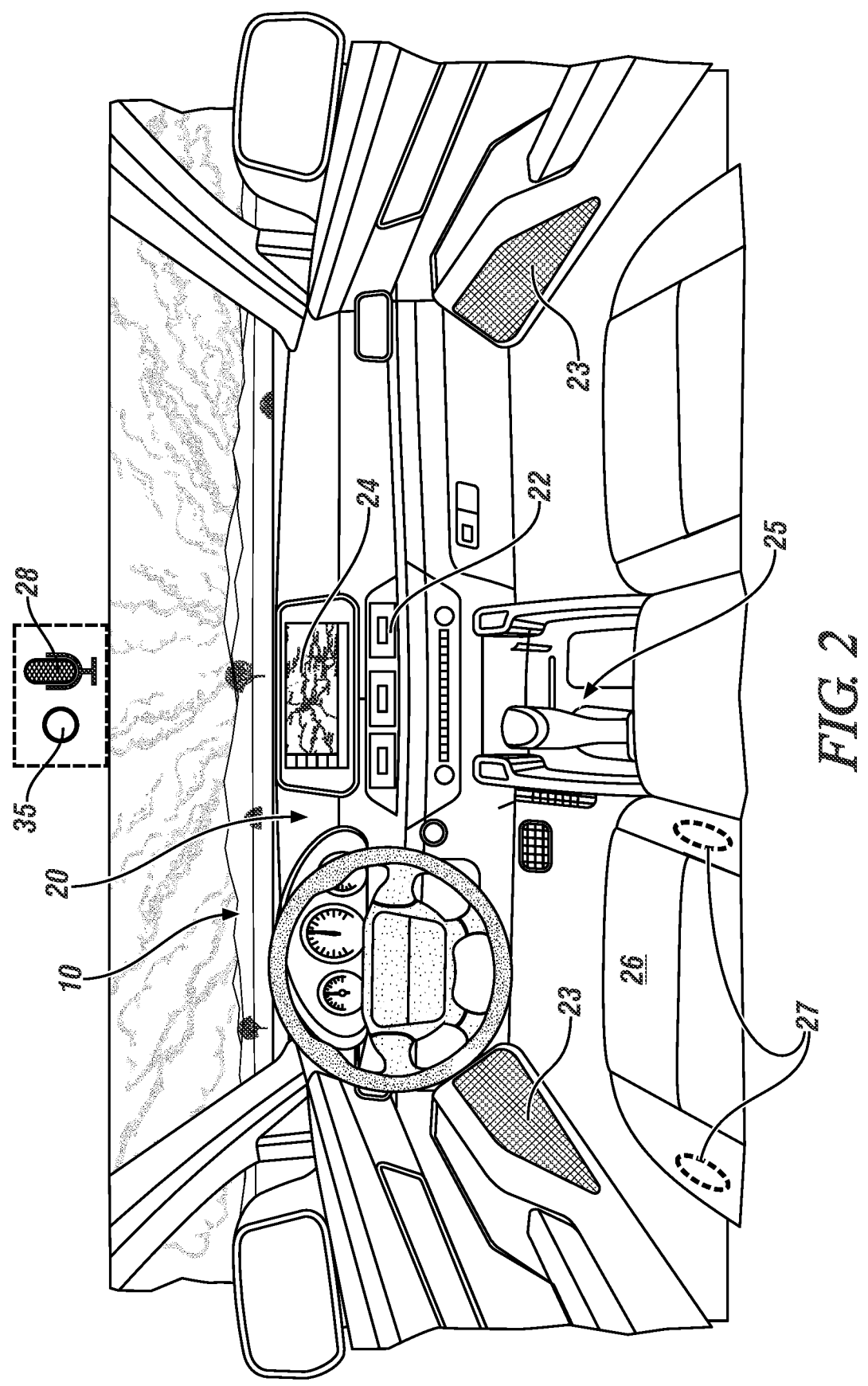
FIG. 2 pictorially illustrates a driver information center for an embodiment of the vehicle, in accordance with the disclosure.

FIG. 2 pictorially shows an embodiment of the passenger cabin 20 for an embodiment of the vehicle 100, including the plurality of operator controls 25, an audio system 22 with at least one speaker 23 and at least one microphone 28, visual display system 24, driver's seat 26, and eCall button 35. In one embodiment, the driver's seat 26 includes a plurality of haptic devices 27 disposed in a seat bottom and/or a seat back. The visual display system 24 is arranged as an electronic visual display device that is capable of electronic presentation of still images, text, and/or video in black-and-white and/or color formats. The visual display system 24 includes one or more of a driver information center, a head-up display, vehicle interior lighting, left and right sideview mirrors, a rear-view mirror, etc. Other elements may be related to the advanced driver assistance system (ADAS) 40, spatial monitoring system 30, navigation system 50 including global positioning system (GPS) sensor 52, human/machine interface (infotainment) system 60, and telematics system 70. The visual display system 24 may be part of the infotainment system 60 in one embodiment.

The term "controller" and related terms such as microcontroller, control unit, processor and similar terms refer to one or various combinations of Application Specific Integrated Circuit(s)(ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component stores machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event.

Communication between controllers, actuators and/or sensors may be accomplished using a direct wired point-to-point link, a networked communication bus link, a wireless link or another suitable communication link, including, e.g., an Ethernet link and a controller area network (CAN) link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium. A parameter is defined as a measurable quantity that represents a physical property of a device or other element that is discernible using one or more sensors and/or a physical model. A parameter may have a discrete value, e.g., either "1" or "0", or may be infinitely variable in value.

Figure 3:
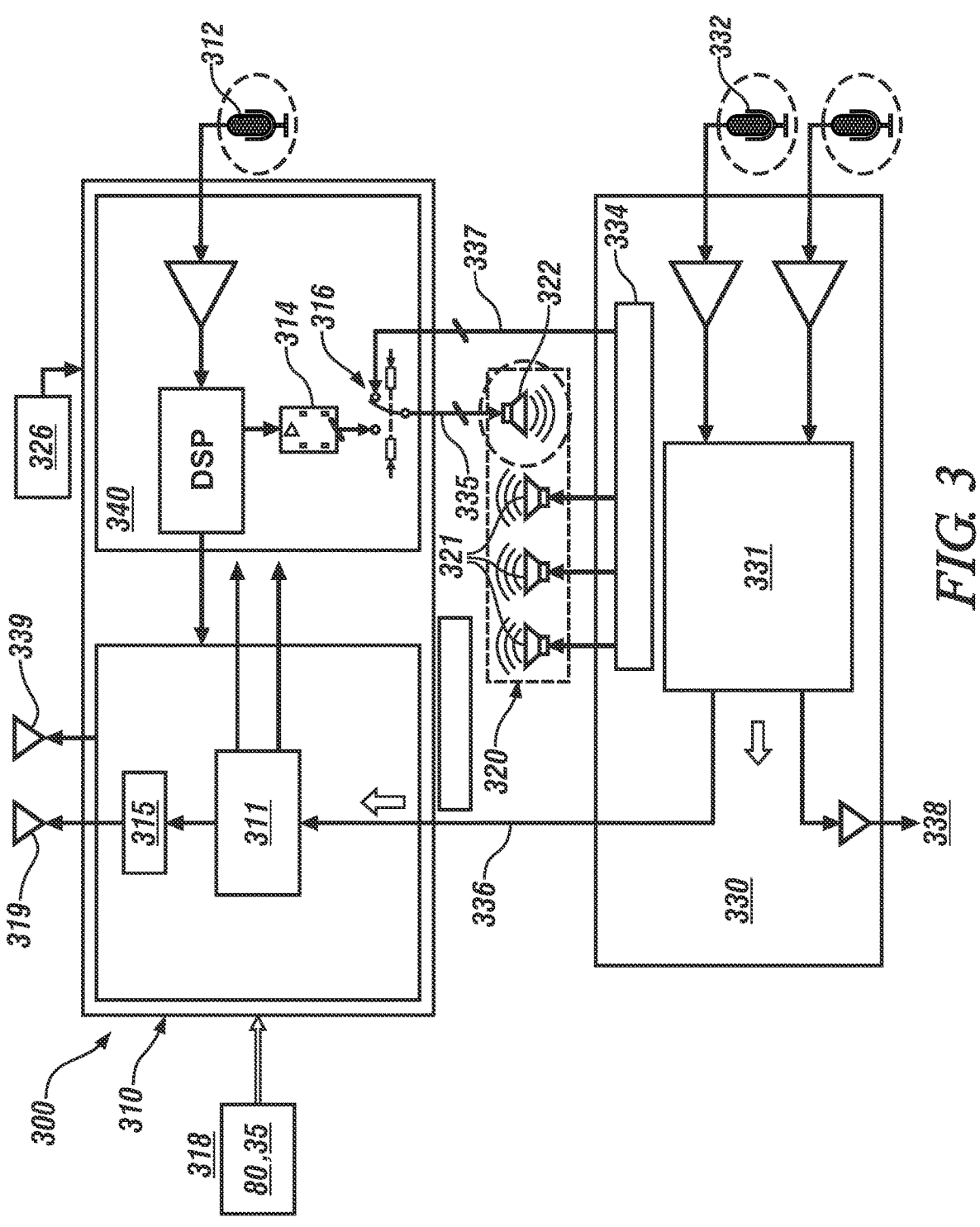
FIG. 3 schematically illustrates an embodiment of a communication system that is capable of providing two-way audio communication between a vehicle 100 and a remote facility, in accordance with the disclosure.

FIG. 3 schematically illustrates an embodiment of the communication system 300 that is capable of providing two-way audio communication between an embodiment of the vehicle 100 and an embodiment of the remote facility 95 and/or the emergency services provider 96 that are described with reference to FIG. 1. The communication system 300 provides two-way audio communication between an occupant of the vehicle 100, e.g., a vehicle operator or passenger, and a call center advisor who is operating at the remote facility 95 and/or the emergency services provider 96. The communication system 300 provides a backup system to support an emergency call, which may be triggered by a post-collision notification message that may be sent from the vehicle 100 to the remote facility 95 and/or the emergency services provider 96.

The communication system 300 is composed of various elements including a telematics controller 310, a second controller 330, a speaker array 320, and a plurality of microphones including a first microphone 312 and a second microphone 332.

As detailed herein, in operation when the telematics controller 310 receives a vehicle input signal 318, an emergency call may be initiated, with two-way audio communication being achieved by the speaker array 320 and microphone 332 that are managed by the second controller 330. In one embodiment, the second controller 330 is an infotainment controller. In one embodiment, the vehicle input signal 318 is a post-collision notification (PCN) 318.

When it is determined that the second controller 330 cannot support an emergency audio call, the telematics controller 310 employs a dual-function audio speaker 322 and first microphone 312.

When DC electric power from the second controller 330 or the vehicle battery has been compromised, two-way audio on the second controller 330 may become unstable, which may require the use of a backup battery 326 under some circumstances.

The telematics controller 310 is integral to the telematics system 70, and includes a first processor 311, a first audio amplifier 314, a radiofrequency (RF) communication link 315 connected to a first RF antenna 319, an audio digital signal processing controller (DSP) 340, and a switch 316. Signals from the first microphone 312 are input thereto. In one embodiment, the first microphone 312 is hardwired to the telematics controller 310. A backup DC electric power supply 326, e.g., backup battery 326, is arranged to supply DC electric power to the first audio amplifier 314 in the event of a fault in a power supply thereto.

The telematics controller 310 is arranged to receive the vehicle input signal 318 and act in accordance therewith. In one embodiment, the vehicle input signal 318 originates from the vehicle monitoring system 80, and may include an input from one or more of the GPS sensor 83, the IMU sensor 84, and/or the airbag deployment sensor 85. In one embodiment, the vehicle input signal 318 indicates the vehicle 100 has experienced a collision event.

The second controller 330 includes a second processor 331 and an amplifier array 334. Signals from the second microphone 332 are input thereto. It is appreciated that there may be multiple microphones in communication with the second controller 330. The second processor 331 has a first communication link 336 to the first processor 311. The second processor 331 has a second communication link 338 to a second RF antenna 339.

In one embodiment, the first RF antenna 319 is disposed on a forward portion of the vehicle 100 described with reference to FIG. 1, and the second RF antenna 339 is disposed on a rearward portion of the vehicle 100. This improves communication robustness in that it reduces a likelihood that both antennas are rendered inoperative in the event of a collision.

The speaker array 320 includes a plurality of first audio speakers 321 and the dual-function speaker 322. The plurality of first audio speakers 321 and the dual-function speaker 322 may be employed to support infotainment systems such as AM/FM/XM radio, subscription services, hands-free cellular phone communications, etc.

The plurality of first audio speakers 321 are directly linked to and support audio communications from the infotainment systems via amplifier array 334.

Speaker 322 is a dual-function speaker in that it is able to support audio communications from the infotainment systems via amplifier array 334 described herein, and also able to directly support audio communications via the first audio amplifier 314 of the telematics controller 310.

Switch 316 is a dual-input, single output switch that has a first input that connects to the first audio amplifier 314 of the telematics controller 310, a second input that connects to the amplifier array 334 of the second controller 330 via an electrical link 335, and an output that links to the dual-function speaker 322. The first processor 311 of the telematics controller 310 operatively controls switch 316.

The amplifier array 334 electrically connects directly to the plurality of first audio speakers 321 via electrical cables or via a direct wireless link.

The amplifier array 334 is selectively electrically connectable to the dual-function speaker 322 via electrical link 337 and the electrical link 335 when switch 316 is controlled by the telematics controller 310 in a first position.

The first audio amplifier 314 is selectively electrically connectable to the dual-function speaker 322 when switch 316 is controlled by the telematics controller 310 in a second position.

The telematics controller 310 is operative to control the switch 316 to employ the dual-function audio speaker 322, the first microphone 312, and the RF communication link 315 to effect audio communication between the vehicle 100 and the remote facility 95, including in response to a command from the telematics controller 310 that is generated based upon an input from the vehicle monitoring system 80. Such input may include, by way of non-limiting examples, input from one or more of the GPS sensor 83, the IMU sensor 84, and/or the airbag deployment sensor 85 that may indicate occurrence of an impact, a collision, or another event.

Furthermore, the telematics controller 310 is operative to control the switch 316 to employ the dual-function audio speaker 322, the first microphone 312, the RF communication link 315 and the first RF antenna 319 to effect audio communication between the vehicle 100 and the remote facility 95 and/or the emergency services provider 96, including in response to a request that originates from the emergency service request activator (eCall) button 35.

Furthermore, the telematics controller 310 is operative to control the switch 316 to employ the dual-function audio speaker 322, the first microphone 312, and the RF communication link 315 to effect audio communication between the vehicle 100 and the remote facility 95, including in response to a request that originates from the remote facility 95 that is communicated to the telematics controller 310.

Figure 4:
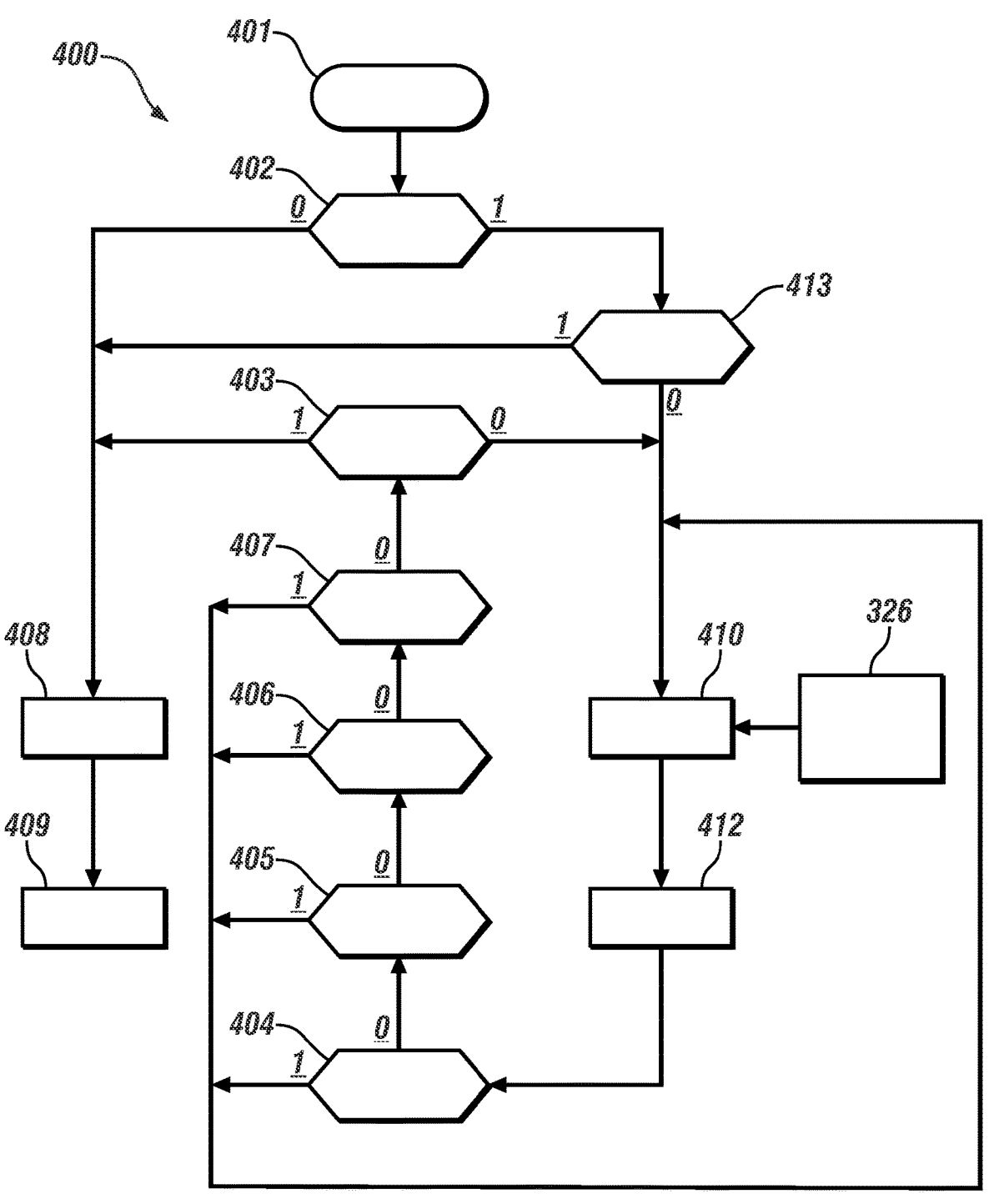
FIG. 4 schematically illustrates a process to provide two-way audio communication between a vehicle 100 and a remote facility, in accordance with the disclosure.

FIG. 4 schematically illustrates a communication process 400, executable by an embodiment of the communication system 300 described with reference to FIG. 3 to provide two-way audio communication between an embodiment of the vehicle 100 and an embodiment of the remote facility 95 and/or the emergency services provider 96 that are described with reference to FIGS. 1 and 2.

The communication process 400 executes by monitoring inputs that originate from the vehicle monitoring system 80, the eCall button 35, or the remote facility 95 that is communicated to the telematics controller 310 (Step 401). Such inputs may be in response to a Post Collision Notification (PCN) signal in one embodiment.

When there is no such input (Step 402)(0), the switch 316 is controlled by the telematics controller 310 to select the dual-function audio speaker 322 (Step 408), employing tuning that is generated by a dynamic infotainment audio path transfer function (Step 409) and this iteration ends with the second controller 330 controlling audio signals to the dual-function audio speaker 322, which may originate from the infotainment systems such as AM/FM/XM radio, subscription services, hands-free cellular phone communications, etc.

When there is one or multiple inputs that originate from the vehicle monitoring system 80, the eCall button 35, and or the remote facility 95 that is/are communicated to the telematics controller 310 (Step 402)(1), the system determines if a fault has been detected in the audio portion of the telematics controller 310 (Step 413).

When a fault has been detected in the audio portion of the telematics controller 310 (Step 413)(1), the switch 316 is controlled by the telematics controller 310 to permit the second controller 330 (e.g., the infotainment controller), to select the dual-function audio speaker 322 (Step 408), employing tuning that is generated by a dynamic infotainment audio path transfer function (Step 409) and this iteration ends with the second controller 330 controlling audio signals to the dual-function audio speaker 322.

When no fault has been detected in the audio portion of the telematics controller 310 (Step 413)(0), the switch 316 is controlled by the telematics controller 310 to permit the telematics controller 310 to select the dual-function audio speaker 322 (Step 410), employing tuning that is generated by a dynamic telematics audio path transfer function (Step 412), with electric power being supplied by the backup battery 326 when needed.

Following this action, the communication process 400 executes a series of checks to determine whether to use the telematics controller 310 or the second controller 330 for further communication.

This includes verifying whether there is an Ethernet link to the second controller 330 (Step 404).

When there is a fault in the Ethernet link to the second controller 330 (Step 404)(1), this iteration ends with the switch 316 being controlled by the telematics controller 310 to control audio signals to the dual-function audio speaker 322 (Step 410), employing tuning that is generated by a dynamic telematics audio path transfer function (Step 412), with electric power being supplied by the backup battery 326 when needed.

When there is no fault in the Ethernet link to the second controller 330 (Step 404)(0), the communication process 400 verifies whether there is a fault in the CAN link to the second controller 330 (Step 405).

When there is a fault in the CAN link to the second controller 330 (Step 405)(1), this iteration ends with the switch 316 being controlled by the telematics controller 310 to permit the telematics controller 310 to select the dual-function audio speaker 322 (Step 410), employing tuning that is generated by a dynamic telematics audio path transfer function (Step 412), with electric power being supplied by the backup battery 326 when needed.

When there is no fault in the CAN link to the second controller 330 (Step 405)(0), the communication process 400 verifies whether there is a fault in a power supply to the second controller 330 (Step 406).

When there is a fault in the power supply to the second controller 330 (Step 406)(1), this iteration ends with the switch 316 being controlled by the telematics controller 310 to permit the telematics controller 310 to control audio signals to the dual-function audio speaker 322 (Step 410), employing tuning that is generated by a dynamic telematics audio path transfer function (Step 412), with electric power being supplied by the backup battery 326 when needed.

When there is no fault in the power supply to the second controller 330 (Step 406)(0), the communication process 400 verifies whether there is a fault in the second controller 330 (Step 407).

When there is a fault in the second controller 330 (Step 407)(1), this iteration ends with the switch 316 being controlled by the telematics controller 310 to permit the telematics controller 310 to control audio signals to the dual-function audio speaker 322 (Step 410), employing tuning that is generated by a dynamic telematics audio path transfer function (Step 412), with electric power being supplied by the backup battery 326 when needed.

When there is no fault in the second controller 330 (Step 407)(0), the communication process 400 determines whether there is a request from the call center advisor who is operating at the remote facility 95 and/or the emergency services provider 96 to employ the second controller 330 to control audio signals to the dual-function audio speaker 322 (Step 403).

When there is a request from the call center advisor who is operating at the remote facility 95 and/or the emergency services provider 96 to employ the second controller 330 (Step 403)(1), the switch 316 is controlled by the telematics controller 310 to permit the second controller 330 (e.g., the infotainment controller), to control audio signals to the dual-function audio speaker 322 (Step 408), employing tuning that is generated by a dynamic infotainment audio path transfer function (Step 409) and this iteration ends with the second controller 330 controlling audio signals to the dual-function audio speaker 322.

When there is no request from the call center advisor who is operating at the remote facility 95 and/or the emergency services provider 96 to employ the second controller 330 (Step 403)(0), the switch 316 is controlled by the telematics controller 310 to permit the telematics controller 310 to control audio signals to the dual-function audio speaker 322 (Step 410), employing tuning that is generated by a dynamic telematics audio path transfer function (Step 412), with electric power being supplied by the backup battery 326 when needed, and this iteration ends.

The concepts described herein provide a system for two-way communication between a vehicle and a remote facility subsequent to a collision event. This includes a system architecture that employs a dual-function vehicle speaker that is driven either by an audio amplifier located in a telematics controller or an audio amplifier located in a second controller, e.g., an infotainment controller, based on logic that is controlled by the telematics controller. The system described herein facilitates use of the dual-function vehicle speaker during an eCall, without diminishing or otherwise affecting audio performance or quantity of speakers available on-vehicle. This may reduce packaging and space requirements and mass by eliminating a need for a standalone speaker, wiring harness reinforcements, brackets, etc. This may reduce manufacturing complexity and service needs.

The concepts provide an architecture and associated method to support emergency calls and general audio on-vehicle employing a single speaker having dual functionality that facilitates working with a telematics controller to support emergency calls, and working with a second controller such as an infotainment controller to support audio not related to an emergency call. Elements of the architecture and associated method may include a single speaker with dual functionality a backup battery a primary cellular antenna a secondary cellular antenna a local microphone connected to the telematics controller a dual pole dual throw switch mechanism that is operatively connected to the telematics controller to route audio signals to the dual-function audio speaker with either the telematics controller or the second controller. The second controller is an info-tainment controller in one embodiment with a second set of microphones. The system also includes an emergency button or eCall button 35 in one embodiment. In one embodiment, a remotely located back office controller is configured to route the audio to either the telematics controller or the second controller to control the single speaker with dual functionality to drive emergency call audio without affecting the audio performance or quantity of other speakers on vehicle. The system is supported by a backup battery to keep two-way audio systems operational on the telematics controller even when the vehicle battery is inoperative.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that may direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A communication system for a vehicle, comprising:
   a telematics controller, the telematics controller in communication with a first microphone;
   the telematics controller including a first amplifier;
   the telematics controller being configured to communicate with a remote facility;
   a second controller, the second controller including a second amplifier;
   an audio speaker;
   a switch being arranged in the telematics controller;
   an electrical link arranged between the second controller and the telematics controller;
   an emergency service request activator in communication with the telematics controller;
   the audio speaker being selectively connectable to the second amplifier via the switch and the electrical link; and
   the audio speaker being selectively connectable to the first amplifier via the switch;
   wherein the switch is operatively controlled by the telematics controller; and
   wherein the telematics controller is operative to control the switch to control the audio speaker to effect audio communication between the vehicle and the remote facility; and
   wherein the telematics controller is operative to employ the first microphone and the audio speaker to effect audio communication between the vehicle and the remote facility in response to a command from the telematics controller, wherein the command from the telematics controller is generated by activation of the emergency service request activator.

2. The communication system of claim 1, wherein the telematics controller is operative to employ the first microphone and the audio speaker to effect audio communication between a vehicle occupant and an advisor located at the remote facility in response to the activation of the emergency service request activator.

3. The communication system of claim 1, wherein the emergency service request activator comprises an actuator button that is disposed in a cabin area of the vehicle and is proximal to a vehicle operator.

4. The communication system of claim 1, further comprising a vehicle monitoring system in communication with the telematics controller;

wherein the telematics controller is operative to employ the first microphone and the audio speaker to effect audio communication between the vehicle and the remote facility in response to a command from the telematics controller, wherein the command from the telematics controller is generated based upon an input from the vehicle monitoring system.

5. The communication system of claim 4, wherein the vehicle monitoring system comprises one of a global position system sensor, an inertial monitoring sensor, or an airbag deployment sensor.

6. The communication system of claim 1, further comprising a secondary battery arranged to supply electric power to the first amplifier when the telematics controller controls the switch to control the audio speaker to effect audio communication between the vehicle and the remote facility.

7. The communication system of claim 1, further comprising the telematics controller being operative to control the switch to control the audio speaker to effect audio communication between the vehicle and the remote facility in response to a request originating from the remote facility.

8. The communication system of claim 1, wherein the telematics controller is operative to employ the first microphone and the audio speaker to effect audio communication between the vehicle and the remote facility upon detection of a fault in the second controller.

9. The communication system of claim 1, wherein the telematics controller is operative to employ the first microphone and the audio speaker to effect audio communication between the vehicle and the remote facility upon a loss of communication with the second controller.

10. A communication system for a vehicle, comprising:
a telematics controller, the telematics controller in communication with a first microphone;
the telematics controller including a first amplifier;
the telematics controller being configured to wirelessly communicate with a remote facility;
a second amplifier and a second microphone;
a dual-function audio speaker;
a switch being arranged in the telematics controller;
an electrical link arranged between the second amplifier and the switch;
the dual-function audio speaker being selectively connectable to the second amplifier via the switch and the electrical link;
the dual-function audio speaker being selectively connectable to the first amplifier via the switch;

wherein the switch is operatively controlled by the telematics controller; and
wherein the telematics controller is operative to control the switch to control the dual-function audio speaker to effect two-way communication between the vehicle and the remote facility.

11. The communication system of claim 10, further comprising an emergency service request activator in communication with the telematics controller;
wherein the telematics controller is operative to employ the second microphone and the dual-function audio speaker to effect two-way communication between the vehicle and the remote facility in response to a command from the telematics controller.

12. The communication system of claim 10, further comprising an emergency service request activator in communication with the telematics controller;
wherein the telematics controller is operative to employ the first microphone and the dual-function audio speaker to effect two-way communication between the vehicle and the remote facility in response to a command from the telematics controller.

13. The communication system of claim 12, wherein the telematics controller is operative to employ the first microphone and the dual-function audio speaker to effect two-way communication between a vehicle occupant and an advisor located at the remote facility in response to the activation of the emergency service request activator.

14. The communication system of claim 10, further comprising a vehicle monitoring system in communication with the telematics controller;
wherein the telematics controller is operative to employ the first microphone and the dual-function audio speaker to effect two-way communication between the vehicle and the remote facility in response to a command from the telematics controller, wherein the command from the telematics controller is generated based upon an input from the vehicle monitoring system.

15. The communication system of claim 14, wherein the vehicle monitoring system comprises one of a global position system sensor, an inertial monitoring sensor, or an airbag deployment sensor.

16. The communication system of claim 10, further comprising a secondary battery arranged to supply electric power to the first amplifier when the telematics controller controls the switch to control the dual-function audio speaker to effect two-way communication between the vehicle and the remote facility.

17. The communication system of claim 10, further comprising the telematics controller being operative to control the switch to control the dual-function audio speaker to effect two-way communication between the vehicle and the remote facility in response to a request originating from the remote facility.

18. The communication system of claim 10, further comprising a second controller, the second controller operatively connected to the second amplifier and the second microphone;
wherein the telematics controller is operative to employ the first microphone and the dual-function audio speaker to effect two-way communication between the vehicle and the remote facility upon detection of a fault in the second controller.

19. A communication method for a vehicle, the method comprising:

arranging a telematics controller in communication with a first microphone, a first amplifier, a switch, and a dual-function audio speaker;

arranging an emergency service request activator in communication with the telematics controller;

controlling, via the telematics controller, the switch to connect the dual-function audio speaker to the first amplifier via the switch;

controlling, via the telematics controller, the switch to connect the dual-function audio speaker to effect two-way communication between the vehicle and the remote facility, wherein the telematics controller is operative to employ the first microphone and the dual-function audio speaker to effect two-way communication between the vehicle and a remote facility in response to a command from the telematics controller; and commanding, via the telematics controller, the first microphone and the dual-function audio speaker to effect audio communication between the vehicle and the remote facility in response to a command from the telematics controller, wherein the command from the telematics controller is generated by an activation of the emergency service request activator.

* * * * *